United States Patent
Müller

[15] 3,651,708
[45] Mar. 28, 1972

[54] GEAR HAVING A DETACHABLE PLASTIC RIM

[72] Inventor: Friedrich Müller, Halstenbek, Germany

[73] Assignee: Aristo-Werke Dennert & Pape KG, Hamburg, Germany

[22] Filed: Sept. 14, 1970

[21] Appl. No.: 72,011

[30] Foreign Application Priority Data

May 2, 1970 Germany .................. P 20 21 685.7

[52] U.S. Cl. ............................................................74/447
[51] Int. Cl. ....................................................F16h 55/12
[58] Field of Search ...........................74/447, 446, 434

[56] References Cited

UNITED STATES PATENTS

| 2,972,903 | 2/1961 | Lee | 74/447 X |
| 3,557,633 | 2/1971 | Frerichs | 74/447 |

FOREIGN PATENTS OR APPLICATIONS

| 1,005,563 | 9/1965 | Great Britain | 74/434 |

*Primary Examiner*—Leonard H. Gerin
*Attorney*—Walter Becker

[57] ABSTRACT

A gear with a metallic core and a peripheral member of synthetic material connected to said core, in which said metallic core has a substantially H-shaped diametric section the legs of which are engaging inwardly extending radial portions of said peripheral member, while axis-parallel pins extend through said core and said peripheral member, one of said legs being adjustable.

7 Claims, 1 Drawing Figure

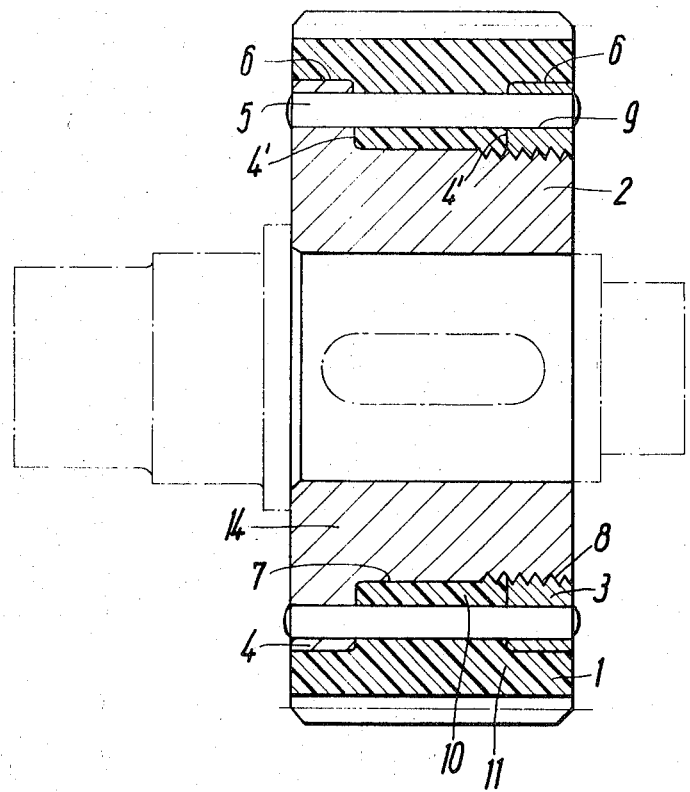

GEAR HAVING A DETACHABLE PLASTIC RIM

The present invention relates to a gear with a metallic core and with a ring of synthetic material.

In transmissions with great running precision, for instance in play-free transmissions employed in particular in measuring and drawing machines and in controlled drives, the heretofore known gears of synthetic material are not sufficient in view of their relatively coarse manufacture. The gears are made either completely of synthetic material or consist of a pressed or injection molded relatively wide ring of synthetic material which is screwed onto a metallic hub. These gears cannot meet the requirements necessary for the above referred to instances of application, especially with respect to their production quality and trueness to shape. The gears are during the manufacturing process and also during operation usually deformed to such an extent that a lack of precision in the running performance of such gears and transmissions is unavoidable.

It is, therefore, an object of the present invention to provide a gear with a ring of synthetic material the deformation of which during its operation and machining will be rather minor while the teeth, when under load, will be elastic such an extent that they can be employed to build up play-free transmissions with a definitely defined elasticity.

This object and other objects and advantages of the invention will appear more clearly from the following specification in connection with the accompanying drawing illustrating a gear according to the present invention.

The gear according to the present invention is characterized primarily in that it has a metallic core which in diametric section is of a substantially H-shape while the gear ring of synthetic material in radial section has substantially a T-shape with a first ring portion extending in radial direction up to the metallic core and with a second ring portion which carries the teeth and extends at the circumference of the gear in a direction perpendicular to the flank of the gear. The second ring portion has a height which does not exceed three times the height of the teeth. The gear according to the invention is furthermore characterized in that the circumference of the gear is provided with a plurality of axis-parallel bolts which extend through the radial legs of the gear ring of synthetic material.

Advantageously, the metallic core consists of a plurality of sections, for instance two sections, namely a central section with a fixed abutment shoulder and with a ring adapted to be firmly connected thereto.

According to a further advantageous embodiment of the invention, the last mentioned ring may be designed so as to be threadedly connectable to an outer thread on the metallic core.

Referring now to the drawing in detail, the gear shown therein comprises primarily a metallic core 2 and a gear ring 1 of synthetic material. The metallic core 2 has a substantially H-shaped cross section and has an abutment shoulder 4 provided on a hub flank. The shoulder extends from a central portion 14 in the direction toward the gear ring 1. The substantially cylindrical outer surface 7 of the metallic core 2 has that side thereof which is adjacent to the hub flank provided with a thread 8. Threaded onto the thread 8 is a ring member 3 in the form of a nut which has outer diameter corresponding to the diameter of the abutment shoulder 4. The thread 8 is so produced that the ring member 3 is with some axial play mounted on the metallic core 2 in order to assure that the ring member 3 will engage as large a surface as possible of the gear ring 1 of synthetic material.

Compared to the large diameter of the metallic core 2, the gear ring 1 of synthetic material is designed as a relatively thin T-shaped ring. This T-shaped ring consists of a ring portion 10 extending up to the metallic core 2 and a ring portion 11 the circumference of which extends at a right angle to the flank of the gear and carries the teeth. The T-shaped cross section of the gear ring need not be box-shaped. Roundings and a dovetail-shaped or circular central leg are also suitable. At any rate, the gear ring 1 has the gear flanks provided with recesses 4' which positively engage and are flush with, on one hand, the abutment shoulder 4 and, on the other hand, with the ring member 3. Gear ring 1 is mounted with play transition fit on the outer surfaces 6 of the abutment shoulder 4 and of the ring member 3 and on the outer surface 7 of the metallic core 2.

The gear body is passed through by a plurality of axis-parallel bores 9 which are distributed over the circumference of the gear at the level of the abutment shoulder 4. Inserted into the bores 9 are cylinder pins 5 which pass through the gear ring 1, the abutment shoulder 4, and the ring member 3 and in this way assure the relative position of these members. Furthermore, the pins 5 prevent the ring member 3 from becoming loose. The pins 5 are in axial direction subjected neither to pull nor pressure in order not to affect the true rotation of the gear by a possible bracing.

While various synthetic materials may be suitable for the gear ring 1, preferably a tempered acetal resin is employed which is able to withstand a high alternating bending stress. It is easily deformable so that the teeth will remain elastic under load. This elasticity brings about the desired freedom of play necessary for high quality transmissions. Moreover, acetal resin is not hygroscopic so that a loss in strength due to the absorption of moisture will be prevented. Acetal resin of the above-mentioned type has good sliding properties and, therefore, wears only slight. A treatment with molybdenum sulphate during the assembly of the gear will make any subsequent servicing unnecessary. When employing other synthetic materials, care is to be taken that such materials have similar properties. Such other materials may, for instance, be polyamides.

As material for the metallic core 2, light metal is used, whereby the dynamic behavior of the transmission is greatly favored. Inasmuch as due to the low strength of the synthetic material great gear widths have to be selected, the strength of light metal will suffice for the construction of gears of synthetic material. Such light metal may be a kneadable aluminum alloy of the type set forth in German Industrial Standards DIN 1798. The material being officially designated Al Mg 3 F 23, No. 3,3535,26.

When producing a gear of synthetic material, the preturned gear ring 1 of synthetic material is pressed onto the metallic core 2 until the recess 4' of the gear ring 1 of synthetic material firmly abuts the abutment shoulder 4 of the metallic core 2. Thereupon the ring member 3 is screwed onto the thread 8 of the metallic core 2. In this connection attention has to be paid to the fact that the ring member 3 must be tightened only to such an extent that the stress values of the synthetic material are not exceeded. At any rate, a flowing of the synthetic material must be avoided in order to obtain a satisfactory frictional connection on the outer surfaces 6, 7 between the gear ring 1 of synthetic material and the metallic core 2. Subsequently, at the level of the abutment shoulder 4 the gear is provided with a plurality of axis-parallel bores distributed over the circumference of the metallic core 2. Corresponding cylinder pins 5 are then inserted into said bores which pins while securing the ring member 3 against becoming loose, will fix the position of the ring 1 relative to the metallic core 2 without the gear body being pressed in axial direction. Subsequently, the teeth are cut in precise relationship to the shaft.

It is, of course, to be understood that the present invention is, by no means, limited to the particular construction shown in the drawing but also comprises any modifications within the scope of the appended claims.

What I claim is:

1. A gear, especially high precision gear, which includes: a metallic core member having lateral radially outwardly extending annular leg sections so that said core member has a substantially H-shaped diametric section, a peripheral member of synthetic material having a substantially T-shaped radial section comprising an outer ring section provided with teeth and also comprising an annular inner section extending radially inwardly of said outer ring section and engaging a peripheral portion of said metallic core member, said outer ring section having a thickness in radial direction amounting at a maximum to three times the height of said teeth, and a plurality of pin means extending substantially parallel to the axis of rotation of said gear and extending through the radial leg sections of said metallic core and the radially inwardly extending annular section of said peripheral member.

2. A gear according to claim 1, in which one of the leg sections of said metallic core member forms an abutment shoulder for engagement with said radially inwardly extending inner section of said peripheral member whereas another one of said leg sections is formed by an adjustable ring adjustable in axial direction of said gear and relative to said abutment shoulder and said radially inwardly extending inner section.

3. A gear according to claim 2, in which said adjustable ring has an inner thread, and in which a peripheral portion of said core member in the region of said adjustable ring is provided with a thread threadedly engaged by said inner thread of said adjustable ring.

4. A gear according to claim 3, in which the inner thread of said adjustable ring engages with axial play the thread of said peripheral portion of said core member.

5. A gear according to claim 1, in which said pin means are so mounted as to be free from an axial load.

6. A gear according to claim 1, in which the synthetic material of said peripheral member is a non-hygroscopic material having high alternating bending and shearing strength.

7. A gear according to claim 1, in which said synthetic material is selected from the group consisting of acetal resin and polyamide.

* * * * *